Patented May 17, 1932

1,858,659

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

TRI-DIPHENYL PHOSPHATE

No Drawing. Application filed September 28, 1929. Serial No. 396,016.

The present invention relates to a new compound, viz., tri-(ortho-diphenyl) phosphate, and to methods for the preparation thereof.

The preparation of triaryl phosphates by means of reacting a phenolic compound with a phosphorus oxyhalide in the presence of a condensation catalyst is well known, and the products so obtained, e. g. tricresyl phosphate, are known and used in the lacquer, cellulose and other industries. I have now discovered that a new and useful product, namely tri-(ortho-diphenyl) phosphate, may be obtained in a similar manner, by catalytically reacting between ortho-phenyl-phenol and a phosphorus oxyhalide, the so obtained new product having the formula:

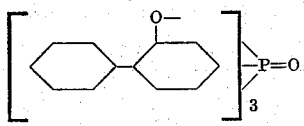

To the accomplishment of the foregoing and related ends, my invention, then, consists of the steps and product hereinafter fully described and particularly pointed out in the claims, the following description setting forth various ways in which the principle of the invention may be used.

For the purpose of illustration, I shall describe one preferred method of preparing tri-(ortho-diphenyl) phosphate. For instance, ortho-phenyl-phenol may be heated to a temperature sufficient to initiate reaction with a phosphorus oxyhalide, and the latter then slowly added, maintaining the temperature at a point whereat no substantial loss of phosphorus oxyhalide by volatilization occurs, until said oxyhalide has been reacted upon at least to form the mono-phosphate. The temperature of the reaction mixture is then slowly raised until the reaction for the formation of the tri-phosphate is substantially completed. Air is then blown through the mixture to remove volatile halo-compounds, after which the principal reaction product may be recovered in any suitable manner, such as by washing with dilute caustic alkali solution and recrystallization from a suitable solvent, with or without a decolorization step, or by distillation of the crude reaction mixture, with or without a previous washing step.

The following example is representative of the manner in which the principle of my invention may be applied.

Example 1

3 moles of ortho-phenyl-phenol and 0.5 per cent of its weight of substantially anhydrous magnesium chloride was heated to about 110 to 120° C., and 1 mole of phosphorus oxychloride then slowly added, keeping the temperature below about 140° C. The temperature was then slowly raised to approximately 180° C., when the reaction was substantially finished. Air was then blown through the hot liquid reaction mixture until volatile chloro-compounds were substantially removed. The still liquid crude reaction product was cooled somewhat and then washed with dilute sodium hydroxide solution, cooled to solidification, and recrystallized from alcohol. (M. p. 114° C.) The yield obtained was about 90 per cent of the theoretical amount.

Tri-(ortho-diphenyl) phosphate is soluble in benzene, alcohol, acetone, etc., and is insoluble in petroleum ether or water. When ordinarily prepared, for instance without employing the air treatment step, it is usually a viscous liquid having a boiling point of over 300° C. at 10 millimeters pressure. However, when prepared by the herein described method, tri-(ortho-diphenyl) phosphate is obtained as a crystalline product. Such crystalline product, upon being melted, may require a somewhat protracted standing before crystallization or re-solidification occurs.

Volatile halo-compounds may be removed, e. g. by air-blowing, from the reaction mixture during the course of the reaction as well as after the reaction is substantially completed, but in general the latter procedure is preferred.

I do not limit my invention to the reaction components specifically aforementioned. The ortho-phenyl-phenol may be substituted in either one or both rings by substituents, e. g. by halogen or alkyl groups, unreactive with the reaction components under the herein prescribed conditions. Phosphorus oxybromide may be employed instead of the oxychloride. Other catalysts than magnesium chloride may be utilized, for instance, the anhydrous chlorides or bromides of calcium, aluminum, iron, cobalt, etc.

In other words, my invention is concerned with tri-(ortho-diphenyl) phosphate and its preparation by any of the methods for the preparation of triaryl phosphates in general, including, preferably, the removal of volatile halo-compounds from the reaction mixture by blowing with air.

Tri-(ortho-diphenyl) phosphate is a new and useful substance, and is adaptable for use as a plasticizer, softener, material for incorporating into varnish, films, etc.

Other modes of applying the principle of my invention may be employed instead of the one explained, change being made as regards the materials or means employed, provided the ingredients or means stated by any of the following claims or the equivalent of such stated ingredients be employed.

I therefore particularly point out and distinctly claim as my invention:—

1. The method of making tri-(ortho-diphenyl) phosphate, comprising reacting ortho-phenyl-phenol with a phosphorus oxyhalide.

2. The method of making tri-(ortho-diphenyl) phosphate, comprising reacting ortho-phenyl-phenol with phosphorus oxychloride.

3. The method of making tri-(ortho-diphenyl) phosphate, comprising reacting ortho-phenyl-phenol with phosphorus oxychloride and blowing air through the reaction mixture to remove volatile chloro compounds.

4. The method of making tri-(ortho-diphenyl) phosphate, comprising reacting ortho-phenyl-phenol with phosphorus oxychloride and blowing air through the reaction mixture after the reaction is substantially completed to remove volatile chloro compounds.

5. The method of making tri-(ortho-diphenyl) phosphate, comprising reacting approximately 3 moles of ortho-phenyl-phenol with 1 mole of phosphorus oxychloride, in the presence of substantially anhydrous magnesium chloride, and blowing air through the reaction mixture after the reaction is substantially completed to remove volatile chloro compounds.

6. As a new compound, tri-(ortho-diphenyl) phosphate, of the formula,

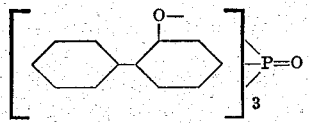

wherein either of the benzene nuclei may be further substituted.

7. As a new compound, tri-(ortho-diphenyl) phosphate, of the formula,

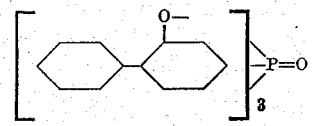

and having a melting point of approximately 114° C.

8. The method of making tri-(ortho-diphenyl) phosphate, which comprises reacting ortho-phenyl-phenol with phosphorus oxychloride in the presence of a metal chloride catalyst, and removing volatile chloro compounds by blowing a substantially inert gas through the reaction mixture after the reaction is substantially completed.

9. The method of making tri-(ortho-diphenyl) phosphate, which comprises heating approximately 3 moles of ortho-phenyl-phenol in the presence of substantially anhydrous magnesium chloride to a temperature of approximately 110° to 120° C., gradually adding 1 mole of phosphorus oxychloride while maintaining the temperature of the reaction mixture below substantially 140° C., then gradually heating the reaction mixture to approximately 180° C., and then blowing air through the hot reaction mixture to remove volatile chloro compounds.

Signed by me this 24 day of September, 1929.

EDGAR C. BRITTON.